United States Patent [19]

Reinke

[11] Patent Number: 5,499,781
[45] Date of Patent: Mar. 19, 1996

[54] FILM SPOOL WITH AXIALLY FLEXIBLE CORE TO ENGAGE AND RELEASE FILM END

[75] Inventor: Stephen M. Reinke, Rochester, N.Y.

[73] Assignee: Eastman Kodak Company, Rochester, N.Y.

[21] Appl. No.: 181,935

[22] Filed: Jan. 14, 1994

[51] Int. Cl.⁶ .......................... B65H 19/28; B65H 75/28; G03B 17/26
[52] U.S. Cl. .................... 242/584.1; 242/587.1; 242/587.3; 354/275
[58] Field of Search .............. 242/584.1, 587.1, 242/587.2, 587.3, 332.8, 532.4, 532.6; 354/275

[56] References Cited

U.S. PATENT DOCUMENTS

| | | | |
|---|---|---|---|
| 2,917,251 | 12/1959 | Newburger | 242/586 |
| 4,334,750 | 6/1982 | Fichter | 354/275 |
| 4,834,310 | 5/1989 | Ikariya et al. | 242/584.1 |
| 4,984,751 | 1/1991 | Hoffacker et al. | 242/584.1 |
| 5,360,183 | 11/1994 | Takahashi et al. | 242/584.1 X |

FOREIGN PATENT DOCUMENTS 62-240957  10/1987  Japan ........................ G03C 3/00

Primary Examiner—John Q. Nguyen
Attorney, Agent, or Firm—Roger A. Fields

[57] ABSTRACT

A film spool comprises a spool core having first and second external core portions movable away from each other to further open a film receiving slot between them to facilitate insertion of a film end into the slot and removal of the film end from the slot, a film engagement protrusion projecting from the first core portion into the slot to engage a film end within the slot and secure the film end to the spool core, and a film stripper protrusion projecting from the second core portion into the slot to disengage a film end from the film engagement protrusion when the core portions are moved away from each other to further open the slot. The film stripper protrusion includes an integral anti-slippage element for holding a film end in engagement with the film engagement protrusion to prevent the film end from slipping off the film engagement protrusion, but is adapted to allow the film end to be disengaged from the film engagement protrusion when the first and second core portions are moved away from each other.

4 Claims, 7 Drawing Sheets

FILM SPOOL WITH AXIALLY FLEXIBLE CORE TO ENGAGE AND RELEASE FILM END

CROSS-REFERENCE TO RELATED APPLICATIONS

Reference is made to commonly assigned applications Ser. No. 08/182,255, entitled FILM SPOOL WITH INTEGRAL CANTILEVER TO ENGAGE AND RELEASE FILM END and filed Jan. 14, 1994, U.S. Pat. No. 5,445,343 in the name of Stephen M. Reinke, and Ser. No. 08/181,322, entitled FILM SPOOL WITH INTERNAL FLEXURES TO ENGAGE AND RELEASE FILM END and filed Jan. 14, 1994, U.S. Pat. No. 5,449,125 in the name of Stephen M. Reinke, each of which are assigned to the assignee of this application.

FIELD OF THE INVENTION

The invention relates generally to the field of photography, and in particular to film spools. More specifically, the invention relates to a film spool with a core or hub that can be flexed axially to engage and release one end of a filmstrip intended to be wound in a film roll onto the spool.

BACKGROUND OF THE INVENTION

The typical film spool, such as a supply spool in a film cartridge or a take-up spool in a camera, is known to include some means for releaseably attaching a film end to the spool.

For example, prior art U.S. Pat. No. 4,334,750, issued Jun. 15, 1982, discloses a film spool comprising an off-axis peripheral slot in the spool core which is dimensioned to receive a reduced-width film end, and a film engagement protrusion that projects through an internal opening into the slot to engage the film end. The engagement protrusion is located on one of two legs of a u-shaped resilient member which is slidable inwardly along a central hollow in the spool core until the engagement protrusion pops through the internal opening from the central hollow into the slot to engage the film end. To release the film end, the engagement protrusion is retracted through the internal opening from the slot into the central hollow as a result of sliding the u-shaped resilient member further along the central hollow against a fixed camming incline in the hollow.

According to another example, prior art U.S. Pat. No. 2,917,251, issued Dec. 15, 1959, discloses a film spool comprising an intermediate resilient hollow section of the spool core which can be bulged outwardly by pressing inwardly at opposite ends of the core. As a result, a pair of axially extending peripheral slits in the spool core will be opened to permit a film end to be inserted into the slits.

PROBLEMS TO BE SOLVED BY THE INVENTION

Prior art U.S. Pat. No. 2,917,251 lacks any means to affirmatively secure a film end in the slits. This allows the film end to be unintentionally pulled out of the slits. Also, there are no constraints in regard to the extent to which the resilient hollow section of the spool core can be bulged outwardly by pressing inwardly at opposite ends of the core. Thus, a fracture might result.

In prior art U.S. Pat. No. 4,334,750, a film end might be unintentionally slipped off the film engagement protrusion. Also, the film engagement protrusion must be retracted from the slot to release the film end, and the u-shaped resilient member can be slid far enough into the central hollow of the spool core when the film engagement protrusion is retracted from the slot that the resilient member may become impossible to grasp in order to reuse the film engagement protrusion.

SUMMARY OF THE INVENTION

According to one aspect of the invention, there is provided a film spool comprising:

a spool core having a pair of external core portions adapted to be flexed away from each other to further open a film receiving slot between them to facilitate insertion of a film end into the slot and removal of the film end from the slot; and respective spaced stops fixed to the pair of core portions to move into abutment with each other when the core portions are flexed away from each other to further open the slot, whereby the extent to which the core portions can be flexed apart is limited.

According to another aspect of the invention, there is provided a film spool comprising:

a spool core having a slot for receiving a film end;

a film engagement protrusion projecting into the slot to engage a film end within the slot and secure the film end to the spool core; and an anti-slippage protrusion projecting into the slot to hold a film end in engagement with the film engagement protrusion to prevent the film end from slipping off the film engagement protrusion, but being movable inside the slot to allow the film end to be disengaged from the film engagement protrusion.

According to another aspect of the invention, there is provided a film spool comprising:

a spool core having a slot for receiving a film end;

a film engagement protrusion projecting into the slot to engage a film end within the slot and secure the film end to the spool core; and a film stripper protrusion movable inside the slot to disengage a film end from the film engagement protrusion without being removed from the slot.

ADVANTAGEOUS EFFECTS OF THE INVENTION

The invention eliminates the problems that may occur with the film spools disclosed in prior art U.S. Pat. Nos. 4,334,750 and 2,917,251.

DETAILED DESCRIPTION OF THE INVENTION

The invention is disclosed as being embodied preferably in a film spool. Because the features of a film spool are generally known, the description which follows is directed in particular only to those elements forming part of or cooperating directly with the disclosed embodiment. It is to be understood, however, that other elements may take various forms known to a person of ordinary skill in the art.

Preferred Embodiment (FIGS. 1–6)

Figure 1:
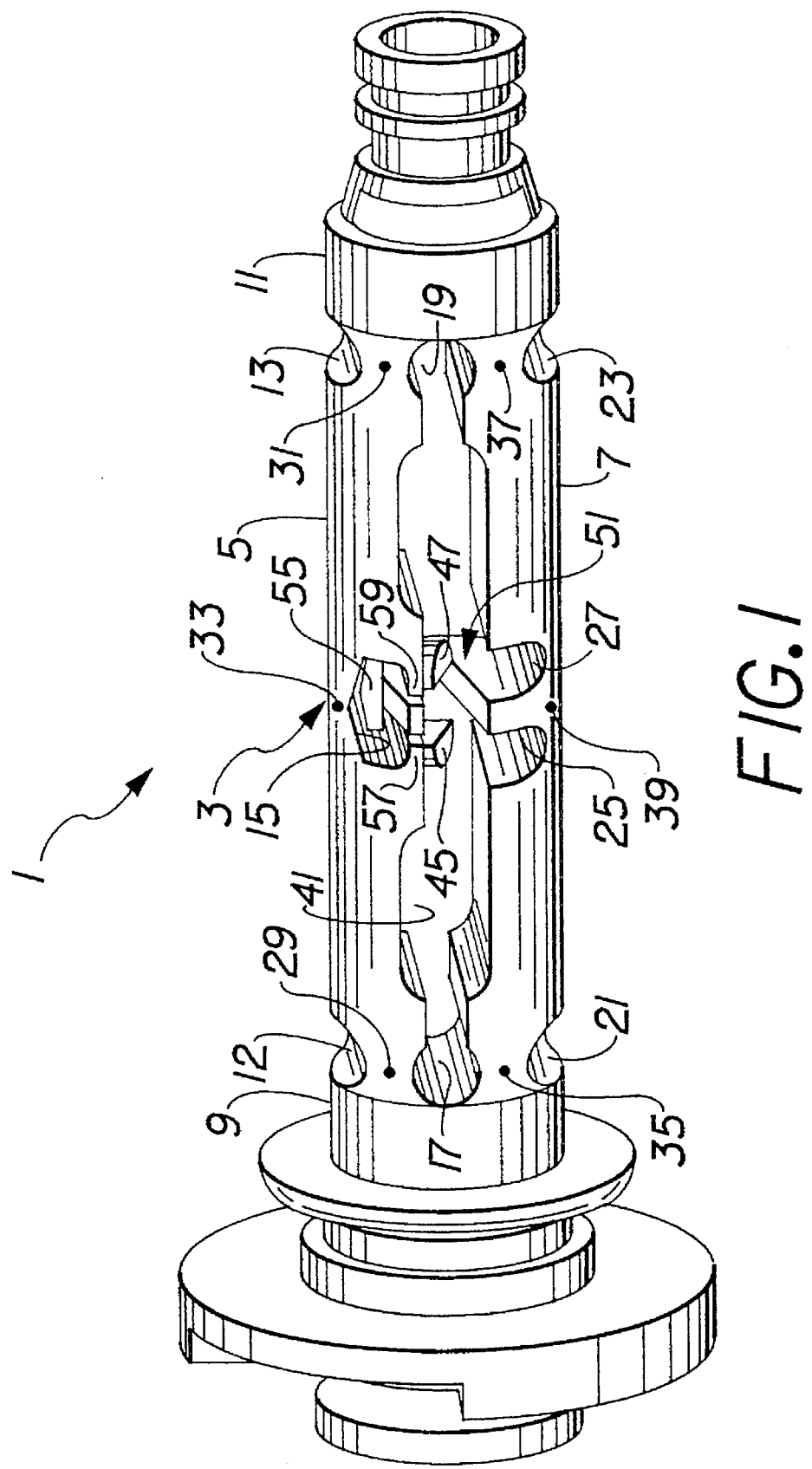
FIG. 1 is a perspective view of a film spool according to a preferred embodiment of the invention.
Figure 2:
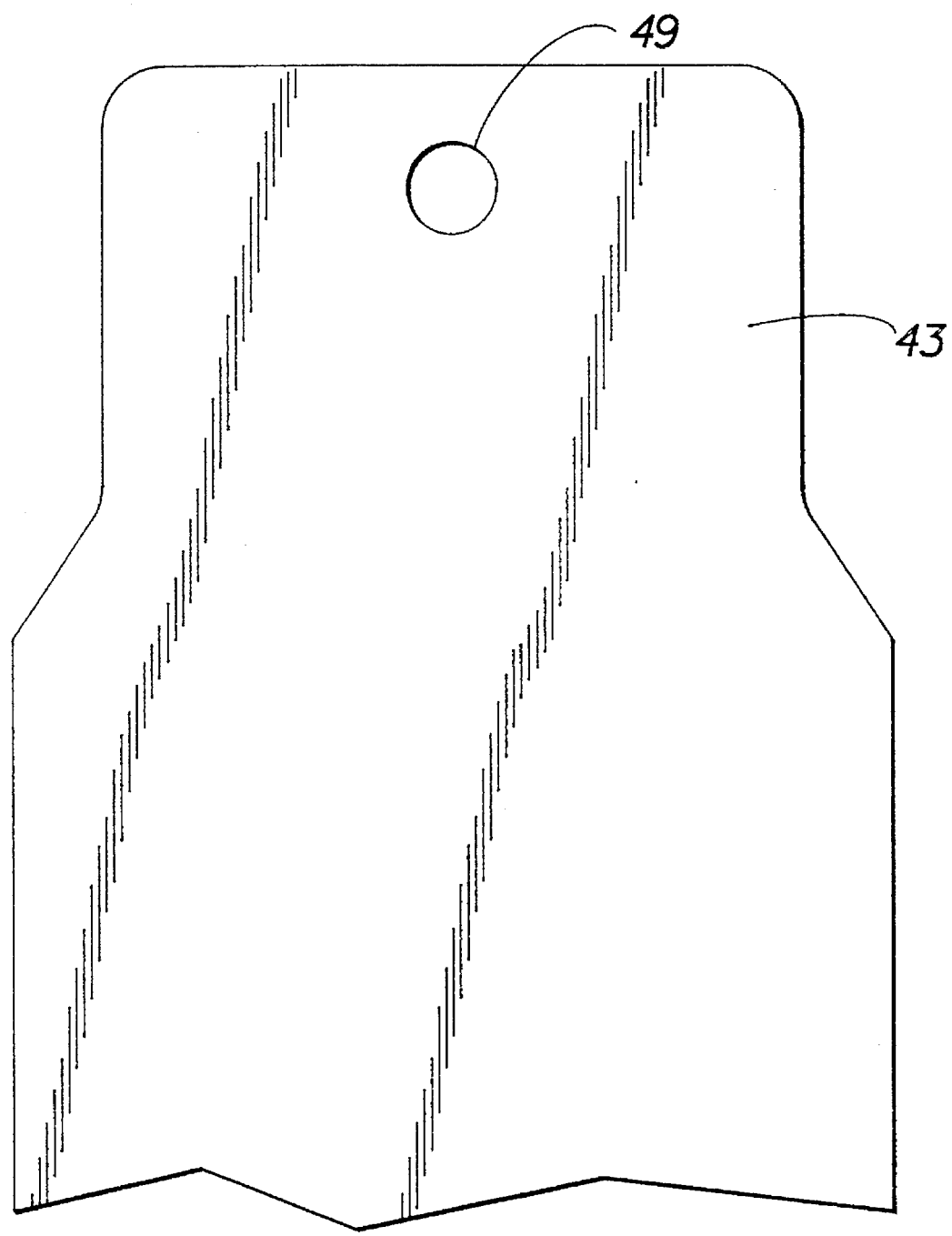
FIG. 2 is a plan view of a film end to be used with the film spool.
Figure 3:
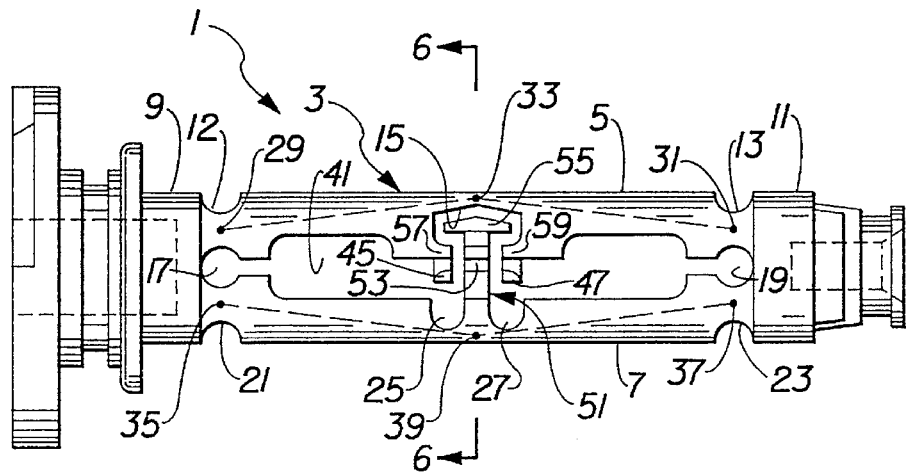
FIGS. 3, 4 and 5 are plan views of the film spool depicting how the film end is secured to the spool.
Figure 4:
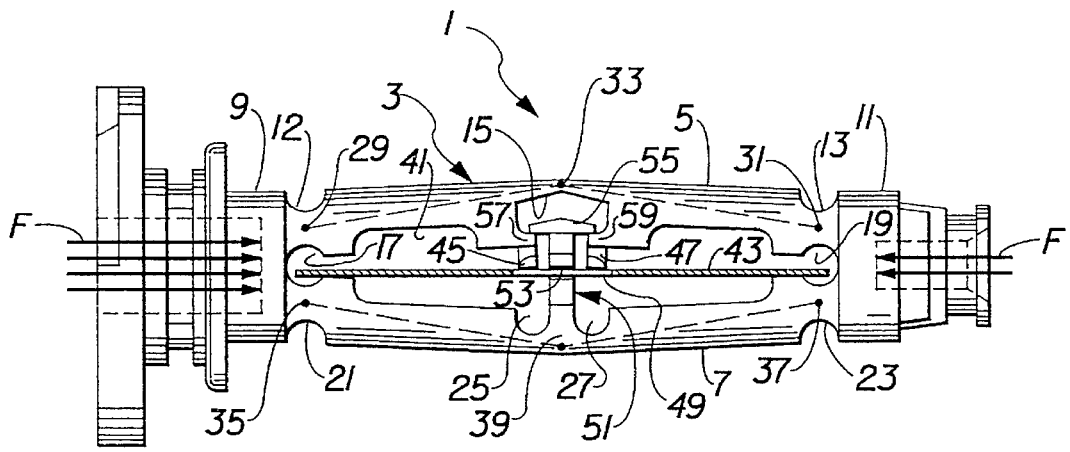

Referring now to the drawings, FIGS. 1 and 3–5 show a film spool 1 with a spool core 3 including a pair of longitudinal core portions 5 and 7. The core portions 5 and 7 are resilient and are joined at opposite rigid ends 9 and 11. A plurality of flexure cut-outs 12, 13, 15, 17, 19, 21, 23, 25, and 27 are arranged on the core portions 5 and 7 to provide weakened or pivot areas 29, 31 and 33 on the core portion 5 and weakened or pivot areas 35, 37 and 39 on the core portion 7. As can be appreciated by looking at the broken lines in FIG. 3, the weakened area 33 is located outward from the weakened areas 29 and 31 and the weakened area 39 is located outward from the weakened areas 35 and 37. Consequently, as shown in FIG. 4, when compressive or inwardly pushing forces F are applied to the opposite ends 9 and 11, the core portions 5 and 7 are flexed away from each other to further open a film receiving slot 41 between them to facilitate insertion of one end 43 of a filmstrip into the slot and removal of the film end from the slot.

A pair of spaced matching film engagement protrusions 45 and 47 project from the core portion 5, at opposite sides of the cut-out 15, into the slot 41. The protrusions 45 and 47 are intended to be received in a hole 49 in the film end 43 to engage the film end within the slot 41 and secure the film end to the spool core 3. See FIGS. 2 and 5.

Figure 5:
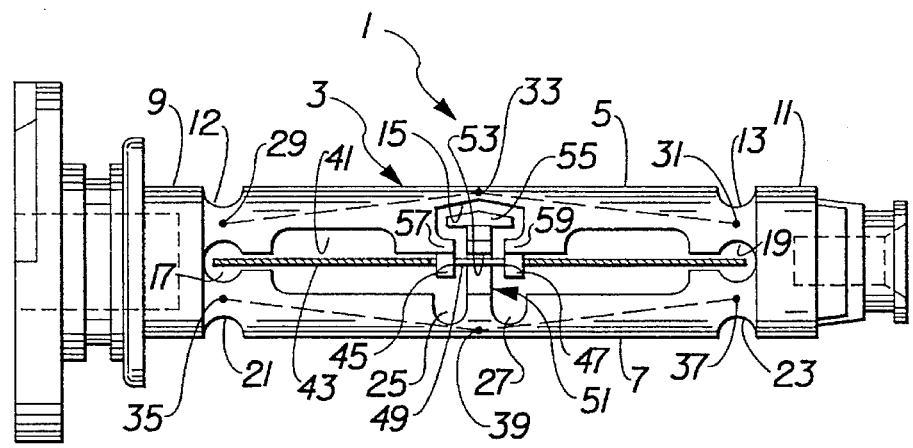
Figure 6:
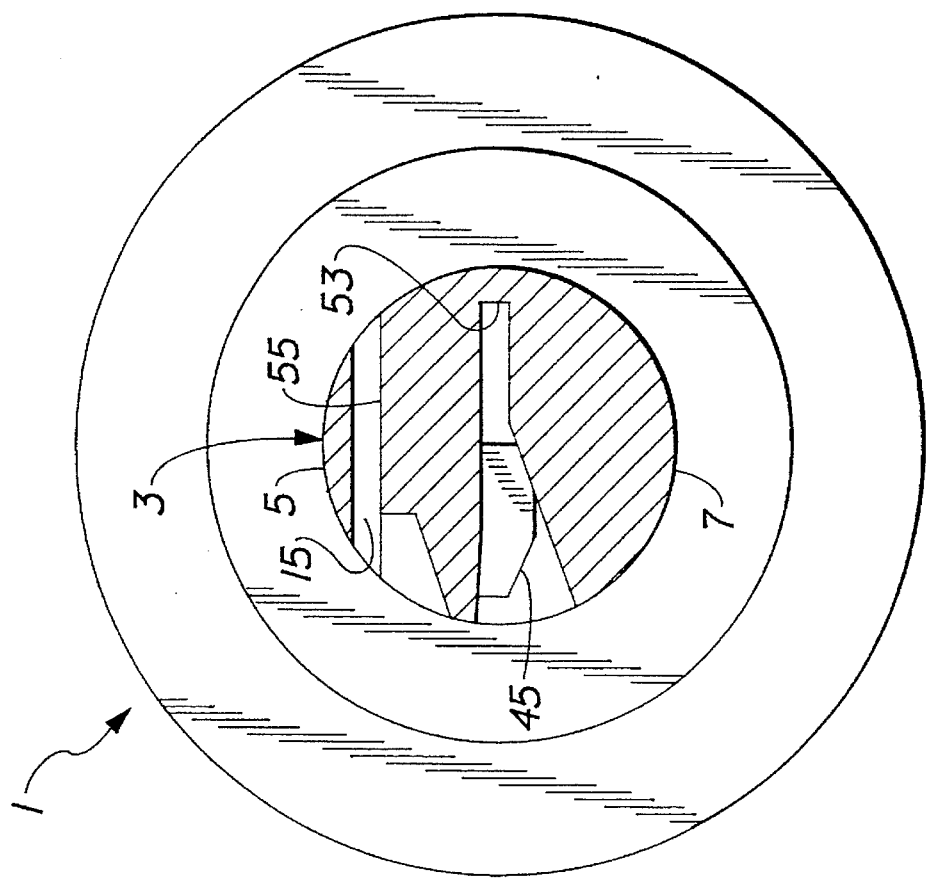
FIG. 6 is a cross-section view of the film spool as seen in the direction of the arrows 6, 6 in FIG. 3.

A film stripper/anti-slippage protrusion 51 projects from the core portion 7, between the cut-outs 25 and 27, into the slot 41 and the cut-out 15. The protrusion 51 includes a film supporting notch 53 located in the slot 41 and an end stop cap 55 located in the cutout 15. See FIGS. 1 and 6. As shown in FIGS. 3–5, to secure the film end 43 to the spool core 3, compressive or inwardly pushing forces F are applied to the opposite ends 9 and 11 to flex the core portions 5 and 7 away from each other to further open the slot 41. The extent to which the core portions 5 and 7 can be flexed apart is limited because a pair of ears 57 and 59 on the core portion 5 block the cap 55 from being moved out of the cut-out 15. With the core portions 5 and 7 held flexed apart, the film end 43 is inserted into the slot 41 and into the notch 53. As shown in FIG. 4, at this time the notch 53 and the protrusions 45 and 47 are located beyond each other. Then, the compressive forces F are removed from the opposite ends 9 and 11, allowing the core portions 5 and 7 to move toward each other to return to their original condition as shown in FIG. 5. Movement of the core portions 5 and 7 toward each other brings the notch 53 and the protrusions 45 and 47 substantially into alignment to cause the protrusions to be received in the hole 49 in the film end 43.

As shown in FIG. 5, the notch 53 operates to hold the film end 43 in engagement with the protrusions 45 and 47 to prevent the film end from slipping off the protrusions as long as the notch and the protrusions are located substantially in alignment. However, when the core portions 5 and 7 are flexed away from each other to locate the notch 53 and the protrusions 45 and 47 beyond each other, the notch operates to remove the film end 43 from the protrusions. See FIG. 4.

Alternative Embodiment FIGS. 7–10

Figure 7:
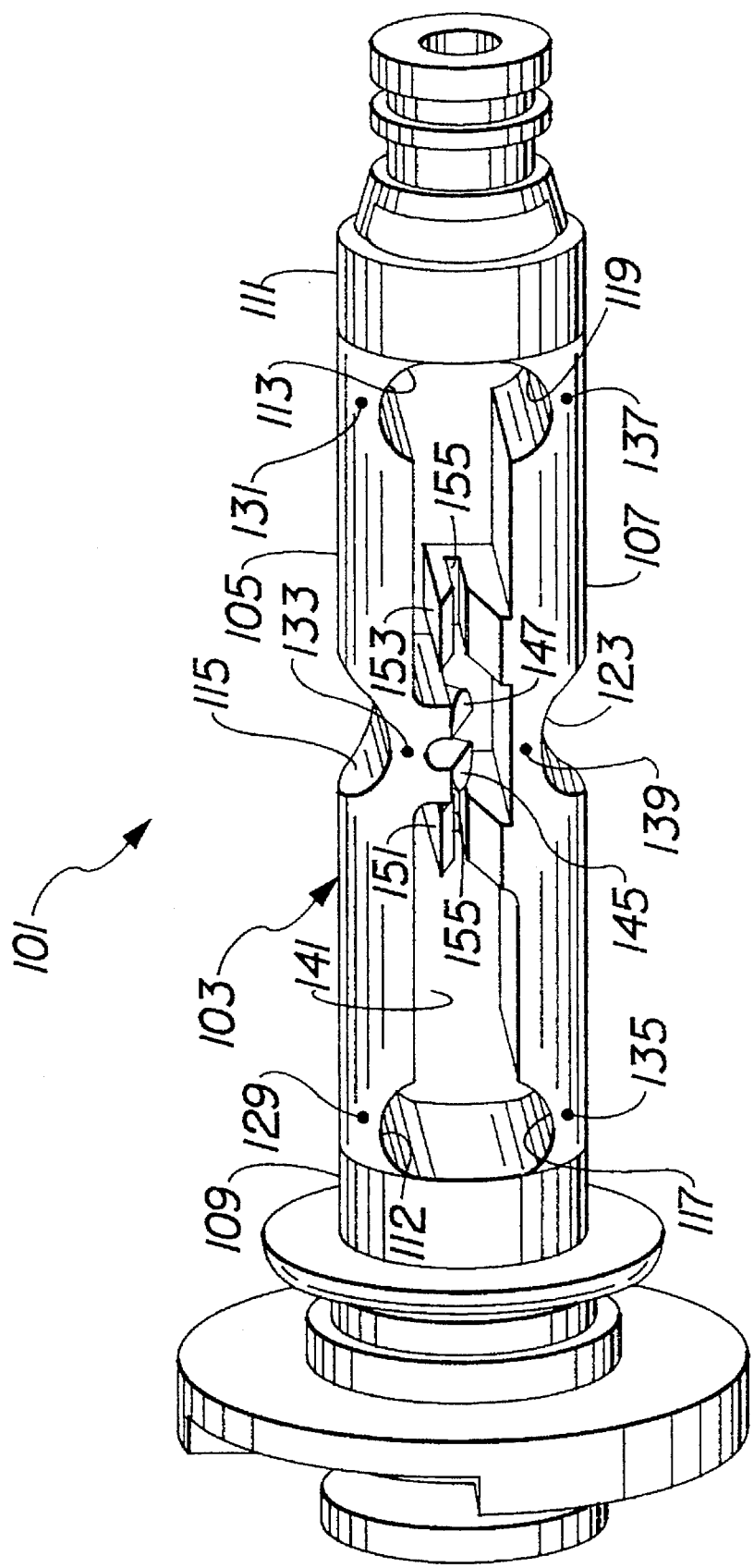
FIG. 7 is a a perspective view of a film spool according to an alternative embodiment of the invention.
Figure 8:
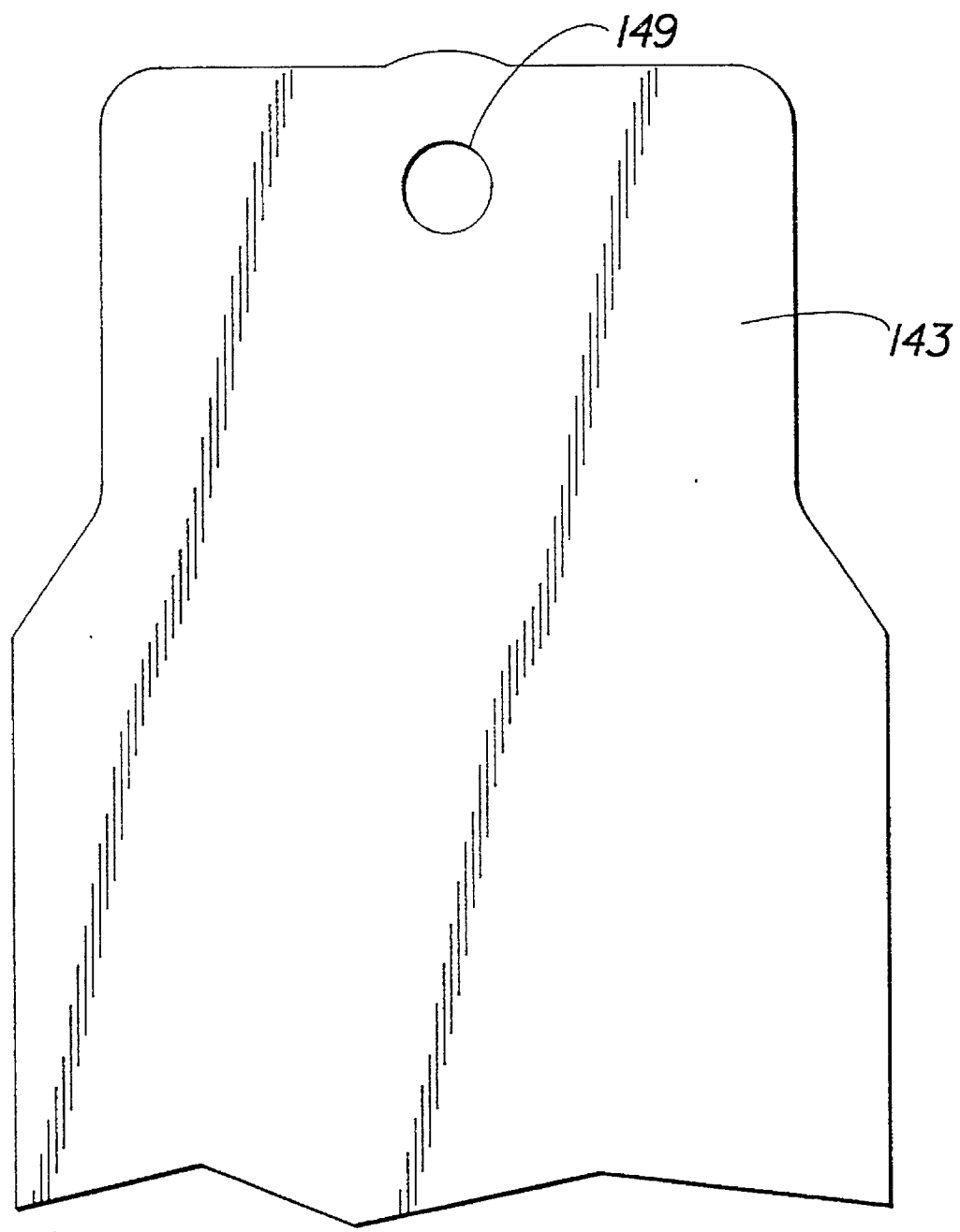
FIG. 8 is a plan view of a film end to be used with the alternative spool.
Figure 9:
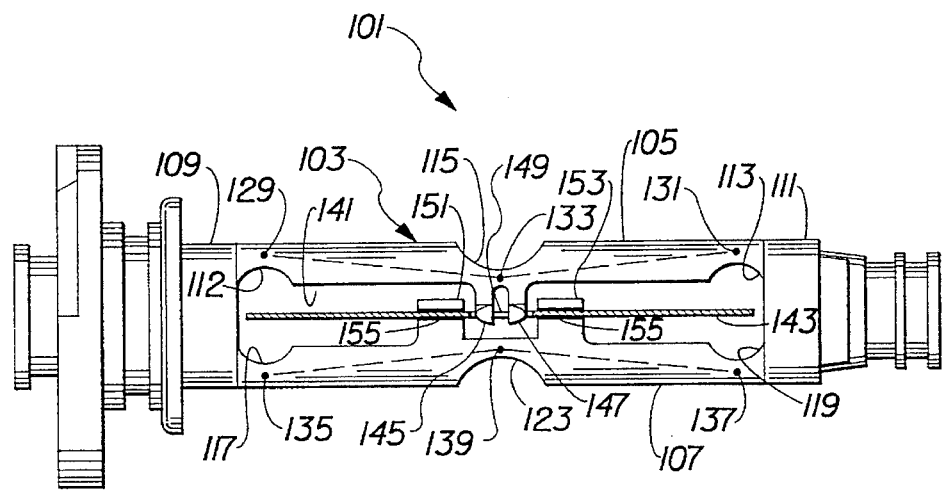
FIGS. 9 and 10 are plan views of the alternative spool depicting how the film end is secured to the spool.
Figure 10:
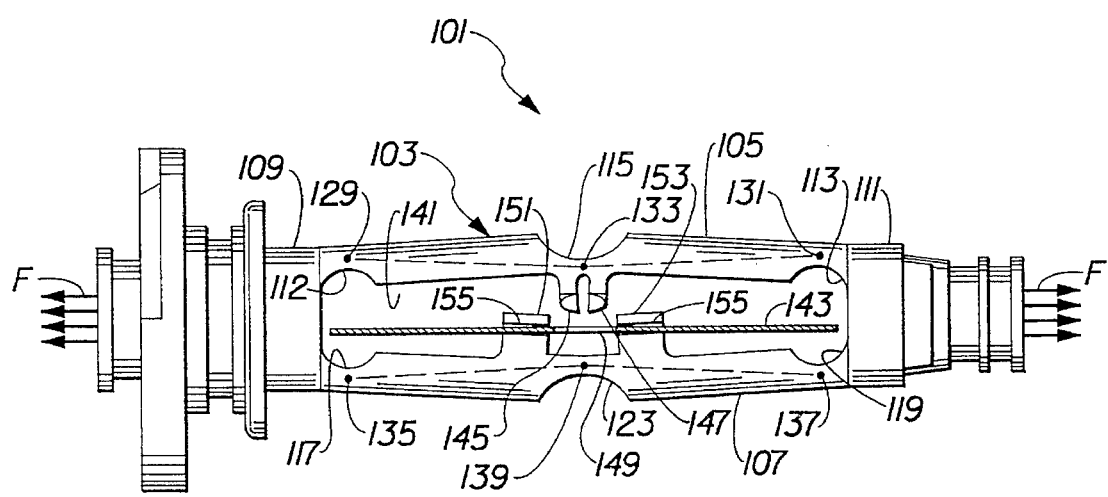

FIGS. 7, 9 and 10 show a film spool 101 with a spool core 103 including a pair of longitudinal core portions 105 and 107. The core portions 105 and 107 are resilient and are joined at opposite rigid ends 109 and 111. A plurality of flexure cut-outs 112, 113, 115, 117, 119, 121 and 123 are arranged on the core portions 105 and 107 to provide weakened or pivot areas 129, 131 and 133 on the core portion 105 and weakened or pivot areas 135, 137 and 139 on the core portion 107. As can be appreciated by looking at the broken angled lines in FIG. 9, the weakened area 133 is located inward of the weakened areas 129 and 131 and the weakened area 139 is located inward of the weakened areas 135 and 137. Consequently, as shown in FIG. 10, when tension or outwardly pulling forces F are applied to the opposite ends 109 and 111, the core portions 105 and 107 are flexed away from each other to further open a film receiving slot 141 between them to facilitate insertion of one end 143 of a filmstrip into the slot and removal of the film end from the slot.

A pair of spaced matching film engagement protrusions 145 and 147 project from the core portion 105 into the slot 141. The protrusions 145 and 147 are intended to be received in a hole 149 in the film end 143 to engage the film end within the slot 141 and secure the film end to the spool core 103. See FIGS. 8 and 9.

A pair of film stripper/anti-slippage protrusions 151 and 153 project from the core portion 107 into the slot 141. The protrusion 151 and 153 each include an identical film supporting notch 155 located in the slot 141. See FIGS. 7 and 10. As shown in FIGS. 9 and 10, to secure the film end 143 to the spool core 103, tension or outwardly pulling forces F are applied to the opposite ends 109 and 111 to flex the core portions 105 and 107 away from each other to further open the slot 141. With the core portions 105 and 107 held flexed apart, the film end 143 is inserted into the slot 141 and into the two notches 155, 155. As shown in FIG. 4, at this time the notches 155 and the protrusions 145 and 147 are located beyond each other. Then, the tension forces F are removed from the opposite ends 109 and 111, allowing the core portions 105 and 107 to move toward each other to return to their original condition as shown in FIG. 9. Movement of the core portions 105 and 107 toward each other brings the notches 155 and the protrusions 145 and 147 substantially into alignment to cause the protrusions to be received in the hole 149 in the film end 143.

As shown in FIG. 9, the notches 155 operate to hold the film end 143 in engagement with the protrusions 145 and 147 to prevent the film end from slipping off the protrusions as long as the notches and the protrusions are located substantially in alignment. However, when the core portions 105 and 107 are flexed away from each other to locate the notches 155 and the protrusions 145 and 147 beyond each other, the notches operate to remove the film end 143 from the protrusions. See FIG. 10.

The invention has been described with reference to a preferred embodiment. However, it will be appreciated that variations and modifications can be effected by a person of ordinary skill in the art without departing from the scope of the invention.

PARTS LIST FOR FIGS. 1–10

1. film spool
3. spool core
5 & 7. core portions
9 & 11. opposite ends
12, 13, 15, 17, 19, 21, 23, 25 & 27. flexure cut-outs
29, 31, 33, 35, 37 & 39. weakened or pivot areas
41. slot
43. film end
45 & 47. film engagement protrusions 49. film hole
51. film stripper/anti-slippage protrusion
53. film supporting notch
55. end stop cap
57 & 59. ears
101. film spool
103. spool core
105 & 107. core portions
109 & 111. opposite ends
112, 113, 115, 117, 119, 121 & 123. flexure cut-outs
129, 131, 133, 135, 137 & 139. weakened or pivot areas
141. slot
143. film end
145 & 147. film engagement protrusions
149. film hole
151 & 153 film stripper/anti-slippage protrusions
155 & 155. film supporting notches

What is claimed is:

1. A film spool comprising:

a spool core having first and second external core portions movable away from each other to further open a film receiving slot between them to facilitate insertion of a film end into said slot and removal of the film end from the slot;

film engagement means projecting from said first core portion into said slot for engaging the film end within the slot to secure the film end to said spool core;

film stripper means projecting from said second core portion into said slot for moving the film end out of engagement with said film engagement means when said first and second core portions are moved away from each other to further open the slot; and respective spaced stops fixed to said first and second core portions to move into abutment with each other when at least one of the core portions is moved away from the other to further open said slot.

2. A film spool as recited in claim 1, wherein said first and second core portions are movable toward each other to close said slot to the extent it is further opened when the core portions are moved away from each other, and said film stripper means includes film supporting means for supporting the film end within said slot to position the film end in engagement with said film engagement means when said core portions are moved toward each other.

3. A film spool as recited in claim 1, wherein said first and second core portions are resilient to permit them to be flexed away from each other to further open said slot in response to being compressed axially at opposite axial ends of the core portions.

4. A film spool comprising:

a spool core having a pair of external core portions adapted to be flexed away from each other to further open a film receiving slot between them to facilitate insertion of a film end into said slot and removal of the film end from the slot; and respective spaced stops fixed to said pair of core portions to move into abutment with each other when the core portions are flexed away from each other to further open said slot, whereby the extent to which the core portions can be flexed apart is limited.

* * * * *